United States Patent
Bhogal et al.

(10) Patent No.: US 7,793,113 B2
(45) Date of Patent: Sep. 7, 2010

(54) GUARANTEED DEPLOYMENT OF APPLICATIONS TO NODES IN AN ENTERPRISE

(75) Inventors: Kulvir S. Bhogal, Fort Worth, TX (US); Alexandre Polozoff, Jr., Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 12/124,684

(22) Filed: May 21, 2008

(65) Prior Publication Data

US 2008/0222164 A1   Sep. 11, 2008

Related U.S. Application Data

(63) Continuation of application No. 11/249,932, filed on Oct. 13, 2005, now abandoned.

(51) Int. Cl.
G06F 11/30 (2006.01)
G06F 15/177 (2006.01)
G06F 9/44 (2006.01)
G06F 9/445 (2006.01)

(52) U.S. Cl. ............... 713/191; 713/1; 713/2; 713/100; 709/220; 709/221; 709/222; 717/171; 717/176

(58) Field of Classification Search ............ None
See application file for complete search history.

(56) References Cited

U.S. PATENT DOCUMENTS

| | | |
|---|---|---|
| 5,841,779 A | 11/1998 | Kainulainen |
| 6,014,669 A | 1/2000 | Slaughter et al. |
| 6,335,937 B1 | 1/2002 | Chao et al. |
| 6,411,967 B1 | 6/2002 | Van Renesse |
| 6,529,960 B2 | 3/2003 | Chao et al. |
| 6,959,331 B1 * | 10/2005 | Traversat et al. ............ 709/222 |
| 7,130,914 B2 | 10/2006 | Toriumi |
| 2002/0004848 A1 | 1/2002 | Sudarshan et al. |
| 2003/0101223 A1 | 5/2003 | Pace et al. |
| 2003/0110172 A1 | 6/2003 | Selman et al. |
| 2005/0055595 A1 | 3/2005 | Frazer et al. |

OTHER PUBLICATIONS

Office Action dated Dec. 24, 2008, U.S. Appl. No. 11/249,932, filed Oct. 13, 2005, USPTO.
Publication No. SE 1297659 entitled "Mobile Switching Center Restart Recovery Procedure"; U.S. Appl. No. 99/805,037; Application Date Mar. 26, 1999; Inventor G. Foti.

* cited by examiner

*Primary Examiner*—Kaveh Abrishamkar
(74) *Attorney, Agent, or Firm*—Dillon & Yudell LLP

(57) ABSTRACT

A method, system and computer program product for updating distributed applications in a multiple application-server environment, in which at least one server receives updates later than another server and update delivery is tracked by an update tracker in the form of a message history, is disclosed. In a preferred embodiment, an application will be distributed across multiple servers and will receive updates from a central repository across a network or other communication fabric. Responsive to starting an application server in the data processing system, a messaging system is contacted over a secure connection to determine whether an application update distribution occurred while the application server was unavailable to update applications, and, responsive to a determination that the application update distribution occurred, an application is received.

15 Claims, 5 Drawing Sheets

GUARANTEED DEPLOYMENT OF APPLICATIONS TO NODES IN AN ENTERPRISE

CROSS-REFERENCE TO RELATED APPLICATION

The present application is a continuation of U.S. patent application Ser. No. 11/249,932, filed on Oct. 13, 2005, entitled "Method and Apparatus to Provide Guaranteed Deployment of Applications to Node in an Enterprise" which is also related to co-pending U.S. patent application Ser. No. 11/104,258, entitled "METHOD AND APPARATUS TO GUARANTEE CONFIGURATION SETTINGS IN REMOTE DATA PROCESSING SYSTEMS" filed on Apr. 12, 2005, and incorporated herein by reference in its entirety.

BACKGROUND OF THE INVENTION

1. Technical Field

The present invention relates generally to data processing, and in particular to data processing in an enterprise composed of a plurality of nodes. Still more particularly, the present invention provides a method, system, and computer program product for deploying applications to nodes in an enterprise.

2. Description of Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the worldwide collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretariats of state. Additionally, providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet protocols exist for transferring information, such as File Transfer Protocol (FTP) and Gopher, but have not achieved the popularity of the Web. In the Web environment, servers and clients effect data transaction using the Hypertext Transfer Protocol (HTTP), a commonly-known protocol for handling the transfer of various data files (e.g., text, still graphic images, audio, motion video, etc.).

The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet also is widely used to transfer applications to users using browsers. With respect to commerce on the Web, individual consumers and businesses use the Web to purchase various goods and services. In offering goods and services, some companies offer goods and services solely on the Web while others use the Web to extend their reach.

Websites are hosted on server data processing systems. Often more than one server data processing system supports transactions or requests directed to a single website. In other words, for a particular URL to a website, more than one server data processing system is available to handle requests from users on the Web. These server data processing systems are often organized onto a grouping referred to as a cluster or server cluster. A cluster is a group of server data processing systems that provides fault tolerance and/or load balancing. If one server data processing system in the cluster fails, one or more additional server data processing systems are still available. Load balancing distributes the workload over multiple data processing system in the cluster.

These server data processing systems run applications used to handle requests. For example, the applications for a website may include applications used to provide information about goods and services, provide a shopping cart, and process orders. Updates to these applications are often made to ensure that the applications and information provided by the applications are up to date. These updates may include, for example, the installation of new application modules. One example of an installation of a new application module could arise from an update of the database tool that accesses data sources associated with a server cluster. Any tools in server data processing systems that are down, out of service, or otherwise unavailable when an installation of a new application module occurs will, under the prior art, be out of synchronization with the rest of the cluster in terms of the use of database tools.

As a result, errors may occur when requests are handled by a server that is out of synchronization with the rest of the cluster. These errors may include, for example, providing incorrect information regarding goods and services that are offered. Another error, for example, is a "data source not found" error. Currently, these server data processing systems remain out of synchronization until a forced resynchronization of the cluster occurs. These resynchronizations require manual intervention by an administrator for the cluster. Further, for this process to occur the administrator must be aware that the server data processing system is now available.

Therefore, it would be advantageous to have an improved method, apparatus, and computer instructions for guaranteeing synchronization installation of new application modules in a set of data processing systems.

SUMMARY OF THE INVENTION

A method, system and computer program product for updating distributed applications in a multiple application-server environment, in which at least one server receives updates later than another server and update delivery is tracked by an update tracker in the form of a message history, is disclosed. In a preferred embodiment, an application will be distributed across multiple servers and will receive updates from a central repository across a network or other communication fabric. Responsive to starting an application server in the data processing system, a messaging system is contacted over a secure connection to determine whether an application update distribution occurred while the application server was unavailable to update applications, and, responsive to a determination that the application update distribution occurred, an application is received.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
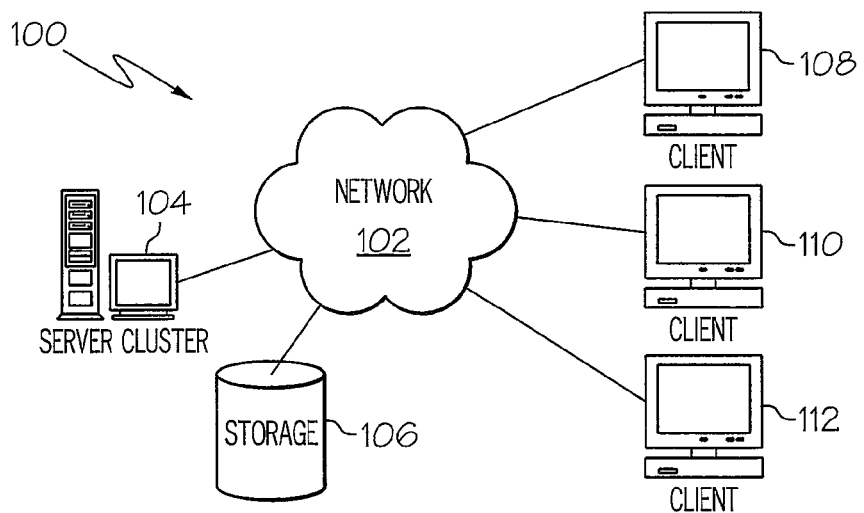
FIG. 1 is a pictorial representation of a network of data processing systems in which the present invention may be implemented.

With reference now to the figures, FIG. 1 depicts a network of data processing systems in which the present invention may be implemented. Network data processing system 100 is a network of computers in which the present invention may be implemented. Network data processing system 100 contains a network 102, which is the medium that provides communications links between various devices and computers connected together within network data processing system 100. Network 102 may include various physical mediums, such as wire, wireless communication links, or fiber optic cables. In one embodiment, network 102 can include a Wide Area Network (WAN) such as the Internet. Of course, network 102 may alternatively or additionally include other networks, for example, an intranet or a local area network (LAN).

In the depicted example, server cluster 104, storage unit 106, and clients 108, 110, and 112 are connected to network 102. Clients 108, 110, and 112 may be, for example, personal computers or network computers. In the depicted example, server cluster 104 provides data, such as boot files, operating system images, and applications to clients 108-112. Network data processing system 100 may include additional servers, clients, and other devices not shown. FIG. 1 is intended as an example, and not as an architectural limitation for the present invention.

Figure 2:
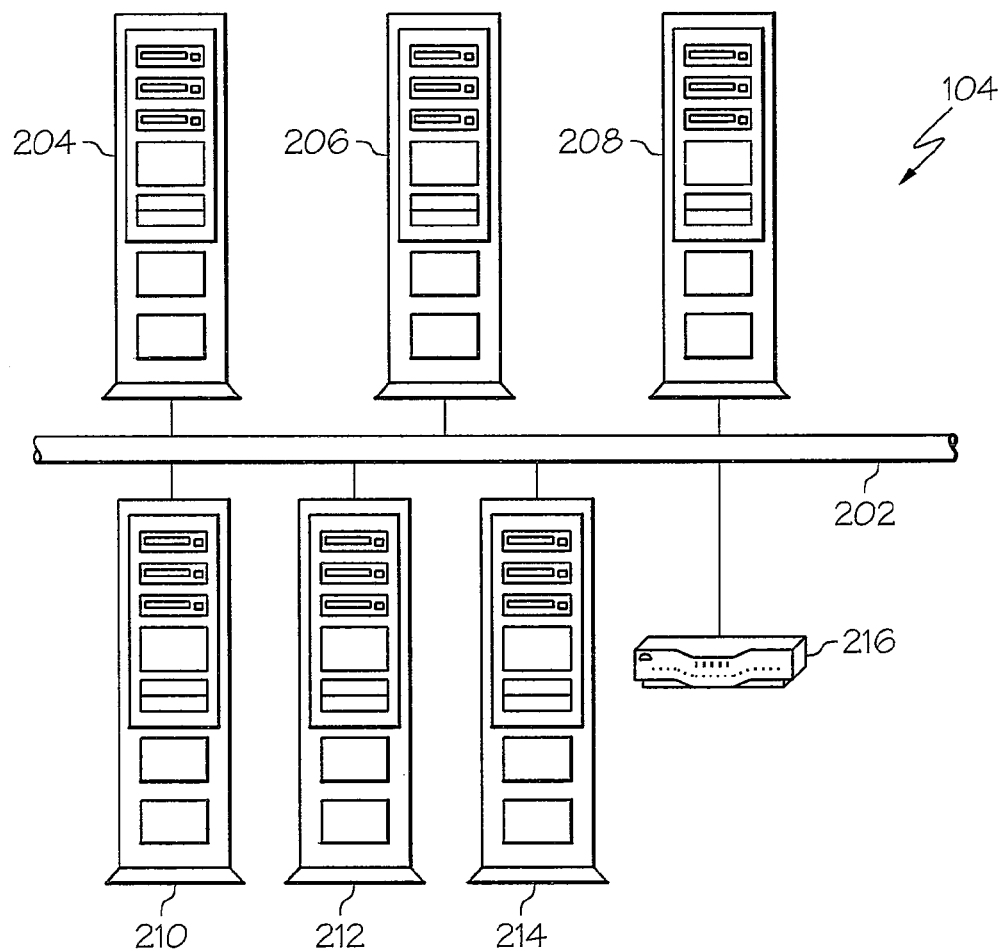
FIG. 2 is a diagram of a server cluster in accordance with a preferred embodiment of the present invention.

FIG. 2 is a diagram of a server cluster in accordance with a preferred embodiment of the present invention. Server cluster 104 contains fabric 202, which may be, for example, a bus, an Ethernet network, or some other interconnect system. Server data processing systems 204, 206, 208, 210, 212, and 214 connect to fabric 202 in server cluster 104.

A traffic scheduler 216, such as a router, is also connected to fabric 202. Although shown as a separate physical component, traffic scheduler 216 may alternatively be a logical construct distributed within one or more of servers 204-214 in server cluster 104.

An initial request from a client 108-112 is received by traffic scheduler 216. Load balancing algorithms and/or other policies may be used to direct this initial request to one of the servers 204-214 in server cluster 104. Subsequent requests by a client may be handled by traffic scheduler 216, or alternatively, may be handled directly by the server 204-214 with which a session is initiated. A session, also referred to as a user session, is the interaction that a user with a unique IP address has with a server during a specified period of time.

Figure 3:
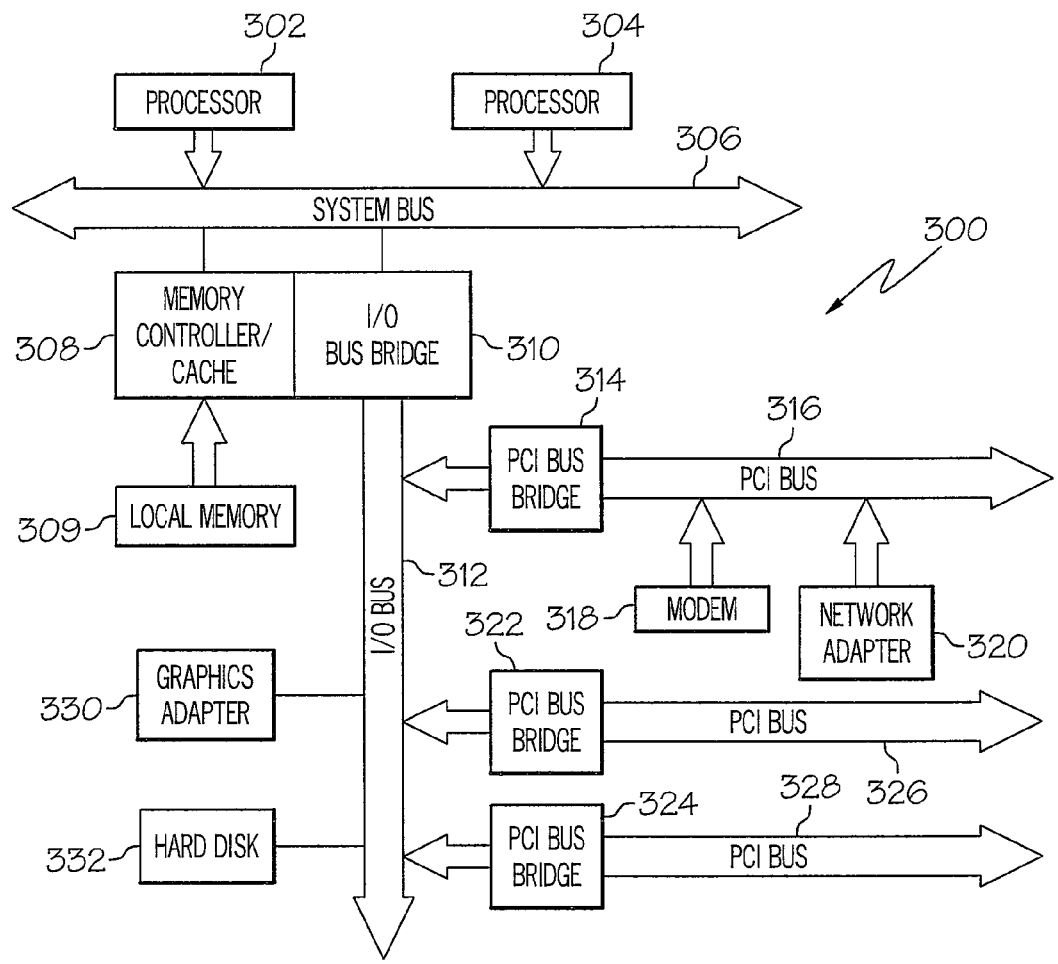
FIG. 3 is a block diagram of a data processing system that may be implemented as a server in accordance with a preferred embodiment of the present invention.

Next, FIG. 3 is a block diagram of a data processing system 300 that may be implemented as a server, such as server 204 in FIG. 2, in accordance with a preferred embodiment of the present invention. Data processing system 300 may be a symmetric multiprocessor (SMP) system including a plurality of processors 302 and 304 that connects to system bus 306. Also, memory controller/cache 308 connects to system bus 306 and provides an interface to local memory 309. I/O bus bridge 310 connects to system bus 306 and provides an interface to I/O bus 312. Memory controller/cache 308 and I/O bus bridge 310 may be integrated as depicted.

Peripheral component interconnect (PCI) bus bridge 314 connects to I/O bus 312 and provides an interface to PCI local bus 316. A number of modems may be connected to PCI local bus 316. Modem 318 and network adapter 320 provide communications links to clients 108-112 in FIG. 1 via network 102. These components connect to PCI local bus 316 through add-in connectors.

Additional PCI bus bridges 322 and 324 provide interfaces for additional PCI local buses 326 and 328, from which additional modems or network adapters may be supported. In this manner, data processing system 300 allows connections to multiple network computers. A memory-mapped graphics adapter 330 and hard disk 332 connect to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

Figure 4:
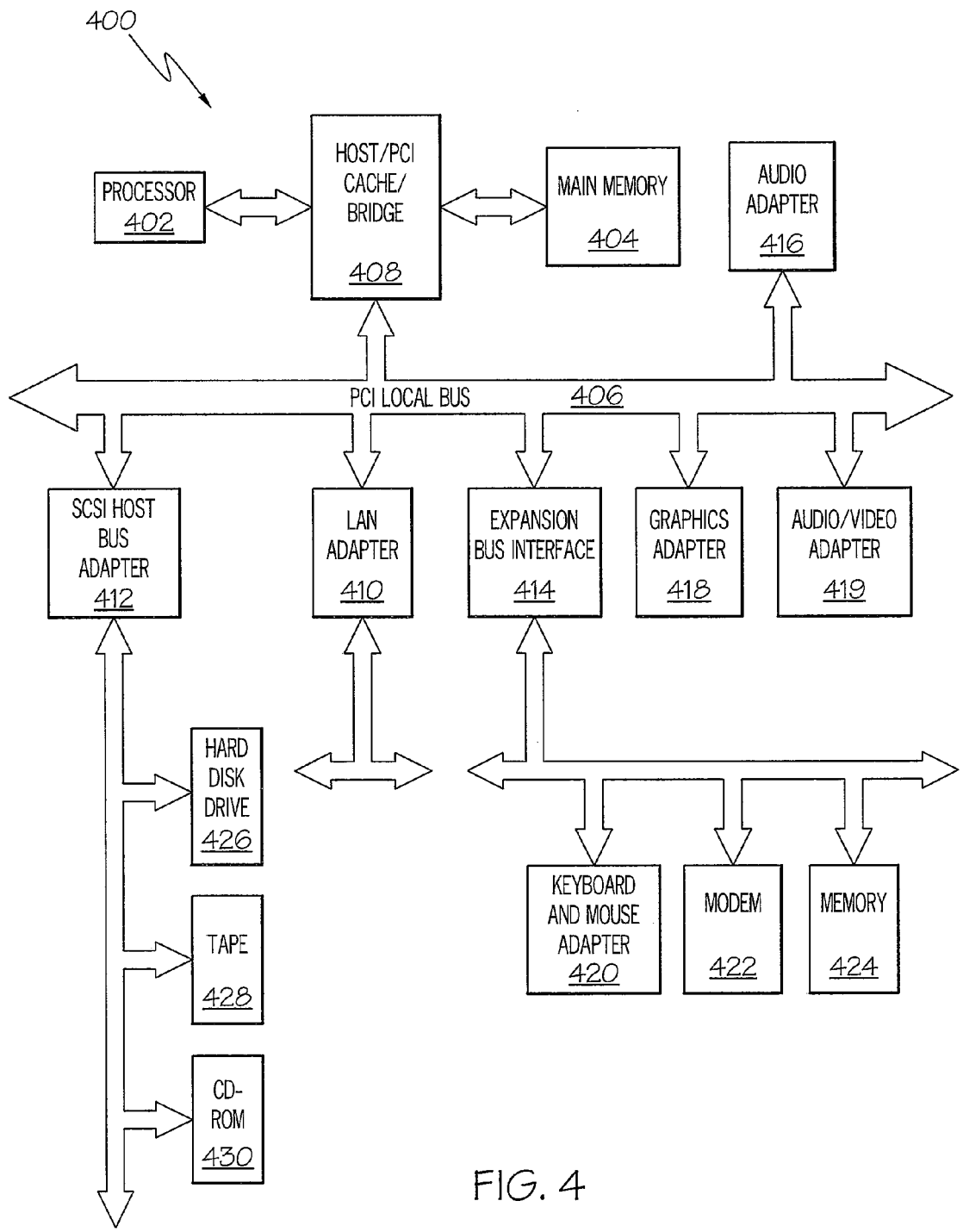
FIG. 4 is a block diagram illustrating a data processing system in which the present invention may be implemented.

FIG. 4 is a block diagram illustrating a data processing system in which the present invention may be implemented. Data processing system 400 is an example of a client computer, such as client computer 108 of FIG. 1. Data processing system 400 employs a peripheral component interconnect (PCI) local bus architecture. Although the depicted example employs a PCI bus, other bus architectures such as Accelerated Graphics Port (AGP) and Industry Standard Architecture (ISA) may be used. Processor 402 and main memory 404 connect to PCI local bus 406 through PCI bridge 408. PCI bridge 408 also may include an integrated memory controller and cache memory for processor 402. In the depicted example, local area network (LAN) adapter 410, small computer system interface (SCSI) host bus adapter 412, and expansion bus interface 414 connect to PCI local bus 406 by direct component connection. In contrast, audio adapter 416, graphics adapter 418, and audio/video adapter 419 connect to PCI local bus 406 by add-in boards inserted into expansion slots. Expansion bus interface 414 connects to a keyboard and mouse adapter 420, modem 422, and additional memory 424. SCSI host bus adapter 412 connects to hard disk drive 426, tape drive 428, and CD-ROM drive 430.

An operating system runs on processor 402 and coordinates and provides control of various components within data processing system 400 of FIG. 4. The operating system may be a commercially available operating system, such as Windows XP, which is available from Microsoft Corporation. An object oriented programming system such as Java may run in conjunction with the operating system and provide calls to the operating system from Java programmer applications executing on data processing system 400. "Java" is a trademark of Sun Microsystems, Inc. Storage devices such as hard disk 426, contain instructions for the operating system, the object-oriented programming system, and applications or programs. Processor 402 loads these instructions into main memory 404 for execution.

Those of ordinary skill in the art will appreciate that the hardware in FIG. 4 may vary depending on the implementation. Other internal hardware or peripheral devices, such as flash read-only memory (ROM), equivalent nonvolatile memory, or optical disk drives and the like, may be used in addition to or in place of the hardware depicted in FIG. 4.

The exemplary architecture depicted in FIG. 4 is not meant to imply any architectural limitation. For example, data processing system 400 also may be a notebook computer, hand held computer, PDA, kiosk computer, a Web appliance, or a multiprocessor data processing system, such as data processing system 300 of FIG. 3.

The present invention provides an improved method, apparatus, and computer instructions for updating and synchronizing deployment of enterprise applications to server data processing systems in a cluster. When an application server process starts, this process contacts a messaging system to determine whether an application update distribution occurred while the application server process was unavailable. If an application update distribution occurred while the server process was unavailable, the application server process receives application data to implement the application update distribution so that the applications for the application server process are updated.

Figure 5:
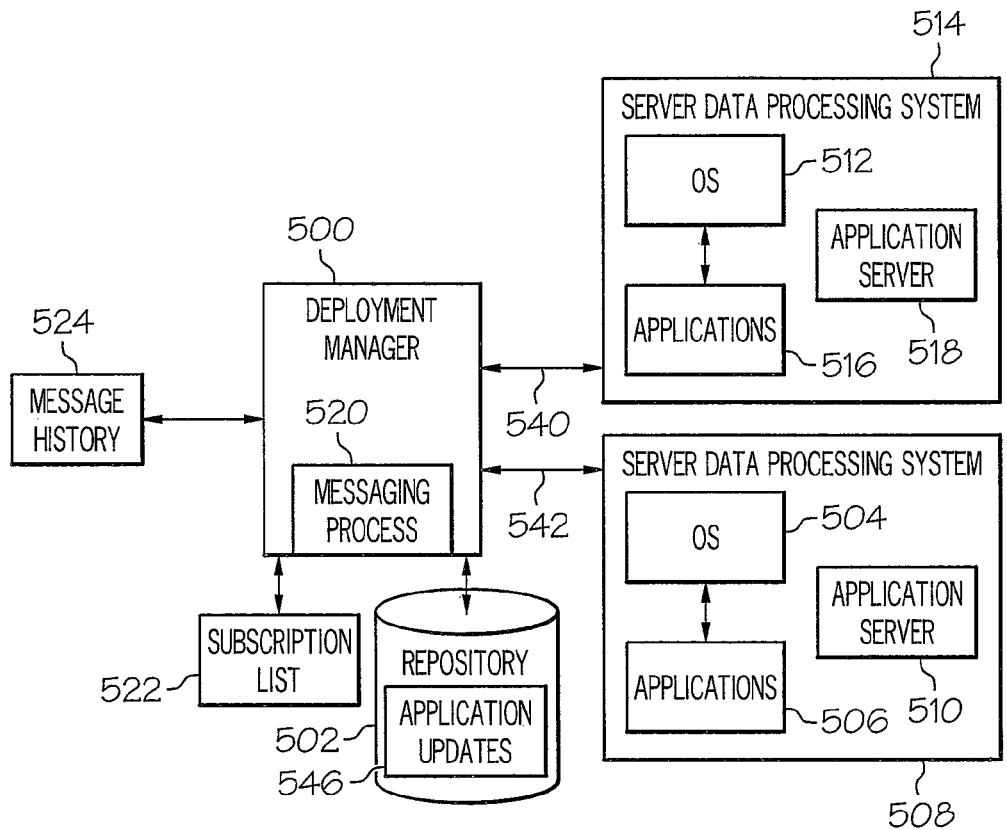
FIG. 5 is a diagram of components used to guarantee that applications in data processing systems are up to date in accordance with a preferred embodiment of the present invention.

FIG. 5 is a diagram of components used on server data processing systems 204-214 to guarantee that applications in server data processing systems 204-214 are up-to-date in accordance with a preferred embodiment of the present invention. In this illustrative example, deployment manager 500, running on any of server data processing systems 204-214 of server cluster 104, is employed to distribute application updates 546, which contain updated executable modules for applications 506 and 516 as well as other updates, from repository 502 to server data processing systems 204-214 of server cluster 104. Repository 502 contains the updates in these examples and is a process running on storage 106. Deployment manager 500 identifies server data processing systems 508 and 514 (previously two of server data processing systems 204-214) in server cluster 104 using subscription list 522, which resides in storage 106, and records communication with server data processing systems 508 and 514 in message history 524, which also resides in storage 106. Subscription list 522 in storage 106 identifies the different data processing systems from among server data processing systems 204-214 that are to receive notifications of updates, such as distributions of application updates 546 to server data processing systems 508 and 514 from repository 502 in storage 106. In the illustrative example presented in FIG. 5, all of the servers in a server cluster 104 in subscription list 522 in storage 106 receive the same distribution of an application update 546.

In particular, operating system (OS) 504 on server data processing system 508 may receive application updates 546 from deployment manager 500 to update applications 506 located within server data processing system 508. Applications 506 contain program modules used by application server 510. Application server 510 handles traffic received from remote data processing systems, such as client 112, utilizing applications 506.

In a similar fashion, operating system 512 in server data processing system 514 may receive application updates 546 from deployment manager 500 to update applications 516. In these examples, application server 518 is a process within server data processing system 514 that handles traffic, such as requests from browsers located on remote data processing systems such as client 108.

In the illustrative example depicted in FIG. 5, deployment manager 500 sends application updates 546 to server data processing system 508 and server data processing system 514. Previously, if one of these server data processing systems were down or out of service or uncontactable when deployment manager 500 deployed an application update, that server data processing system would be out of synchronization with the other server data processing systems. For example, if server data processing system 508 were unavailable when an application update 546, replacing modules in applications 506 and 516 for the server cluster 104, were deployed, server data processing system 508 would not have the most up-to-date modules in its applications 506 and would therefore be out of synchronization with server data processing system 514. This situation previously required a forced resynchronization that was initiated by an administrator.

Messaging process 520 within deployment manager 500 sends application updates 546 to server data processing systems 508 and 514. Messaging process 520 is part of a durable subscriber system, and may communicate using standard encryption and authentication protocols over secure connections 542 and 540 with server data processing systems 508 and 514, respectively. Messaging process 520 saves messages to message history 524 if they are published or sent while a subscriber is disconnected or is otherwise unavailable. Messaging process 520 delivers these messages when the subscriber reconnects to the messaging system.

Operating systems, such as operating system 504 in server data processing system 508 and operating system 512 in server data processing system 514 are configured to receive these distributions from messaging process 520. These operating systems send a response or acknowledgement to messaging process 520 when the distribution of application updates 546 is received from messaging process 520.

For example, if server data processing system 508 is unavailable and does not return a reply to a distribution of application updates 546, deployment manager 500 places the identification of that server data processing system and the undelivered message into message history 524. When server data processing system 508 becomes available again, operating system 504 announces its availability to messaging process 520. Operating system 504 directs this announcement to messaging process 520 over secure connection 542 in these examples. This announcement may be, for example, contained in a message sent by operating system 504 to messaging process 520 over secure connection 542 to announce that server data processing system 508 is now present. Alternatively, some other type of connection may be made between operating system 504 and messaging process 520.

In response to detecting the presence of operating system 504 on server data processing system 508, messaging process 520 checks message history 524 to determine whether any undelivered application updates 546 are present for operating system 504. In this illustrative example, messaging process 520 finds that a message announcing an application update 546 is undelivered. In response to this determination, messaging process 520 sends the undelivered application update 546 to operating system 504 over secure connection 542. In turn, operating system 504 retrieves application updates 546 over secure connection 542 to update applications 506. As a result, applications 506 are now synchronized with the rest of the server data processing systems in server cluster 104. This type of deployment uses a "push" to deploy application updates 546 to the subscribers. A daemon process running on each server data processing system 204-214 may be used to check message history 524 for changes if a "pull" mechanism is used by operating system 504.

Figure 6:
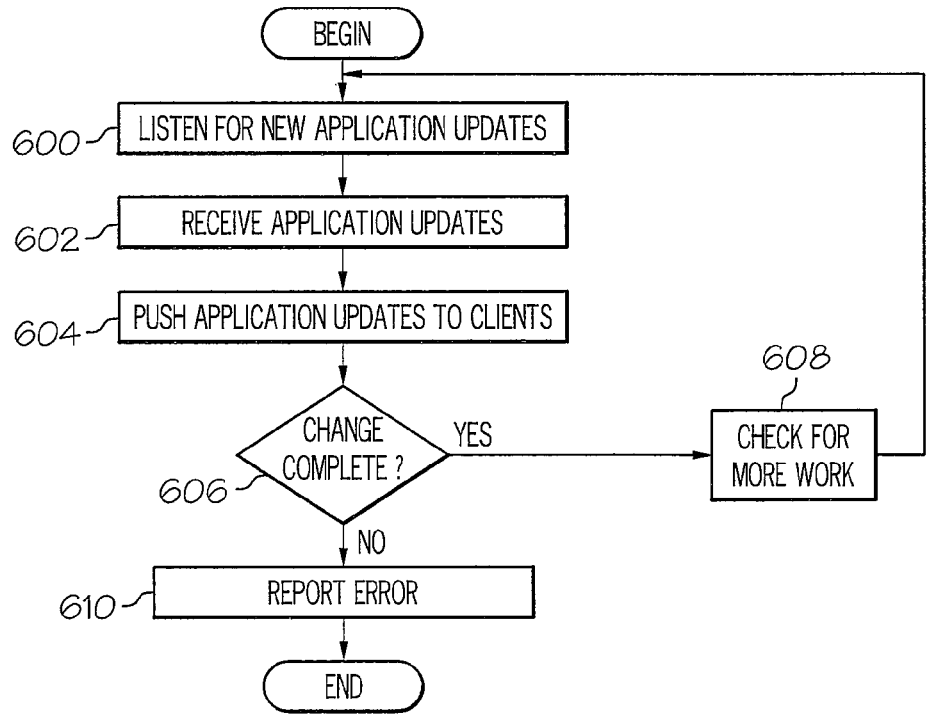
FIG. 6 is a flowchart of a process for identifying application update distributions using a durable subscription in accordance with a preferred embodiment of the present invention.

FIG. 6 is a flowchart of a process for identifying distributions of application updates 546 using a durable subscription in accordance with a preferred embodiment of the present invention. The process illustrated in FIG. 6 may be implemented by deployment manager 500 in a data processing system, such as server data processing system 508 in FIG. 5.

The process begins with a deployment manager 500 listening for distributions of new application updates 546 (step 600). When an application update distribution is present, deployment manager 500 receives application updates 546 (step 602) from repository 502. These application updates 546 are received through an interface such as a web based interface, an FTP interface, or some other interface. Deployment manager 500 pushes applications 546 distributions to subscribing operating systems 504 and 512 (step 604). For example, step 604 may be used to replace a database engine on all the server data processing systems 204-214 participating in a server cluster 104. The deployment manager 500 pushes the application updates 546 from repository 502 to update applications 506 and 516 on application servers 510 and 518 on subscribing server data processing systems 508 and 514, respectively.

Next, deployment manager 500 makes a determination as to whether the distribution of application updates 546 is complete (step 606). In step 606, the distribution of application updates 546 is considered complete if server data processing systems 508 and 514 have received and installed the application update 546. Deployment manager 500 receives acknowledgements from server data processing systems 508 and 514 to indicate that the distribution of application updates 546 has been completed. If an acknowledgement is not received, then deployment manager 500 defaults to the assumption that the distribution of application updates 546 has not been completed. Deployment manager 500 then checks for additional application updates 546 in repository 502 (step 608), with the process returning to step 600 to listen for more new application updates 546. In step 608, a check is made by determining if new application updates 546 are present to be distributed.

Turning back to step 606, if a completion notice is not present, deployment manager 500 reports the error (step 610), with the process terminating thereafter.

Figure 7:
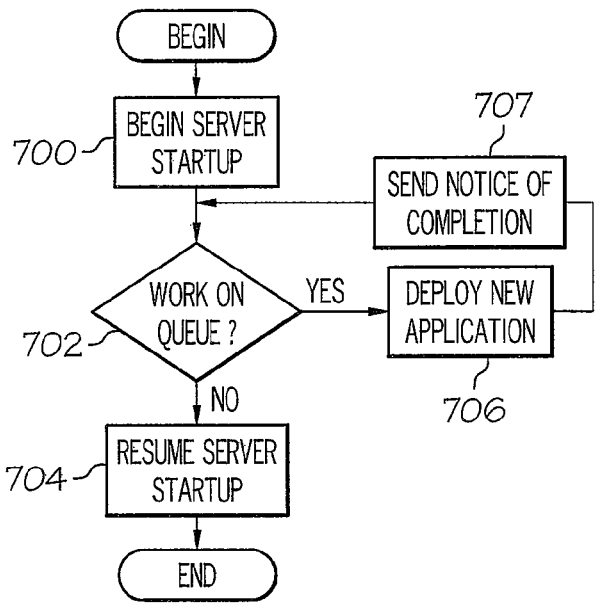
FIG. 7 is a flowchart of a process for checking for application update distributions upon startup in accordance with a preferred embodiment of the present invention.

Next, FIG. 7 is a flowchart of a process for checking for application updates 546 upon startup in accordance with a preferred embodiment of the present invention. The process illustrated in FIG. 7 is implemented in operating system 504 of server data processing system 508 in FIG. 5.

The process begins with startup of server data processing system 508 (step 700). Next, server data processing system 508 determines whether the application updates 546 are present on a queue (step 702) in operating system 504, which buffers received application updates 546. In step 702, server data processing system 508 makes a determination as to whether a notification has been received from the messaging process 520 of deployment manager 500 that indicates that an application update 546 is present. If the an application update 546 is not present on the queue, server data processing system 508 resumes startup (step 704) with the process terminating thereafter. With reference again to step 702, if an application update 546 is present on the queue, server data processing system 508 installs the application update 546 (step 706). The process then moves to step 707, at which server data processing system 508 sends a notice of completion to messaging process 520 for storage in message history 524, with the process returning to step 702.

Figure 8:
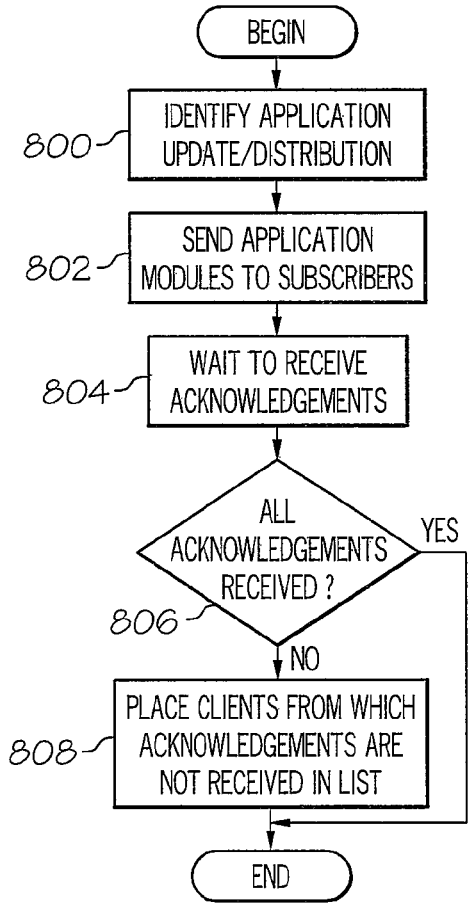
FIG. 8 is a flowchart of a process for announcing application update distributions in accordance with a preferred embodiment of the present invention.
Figure 9:
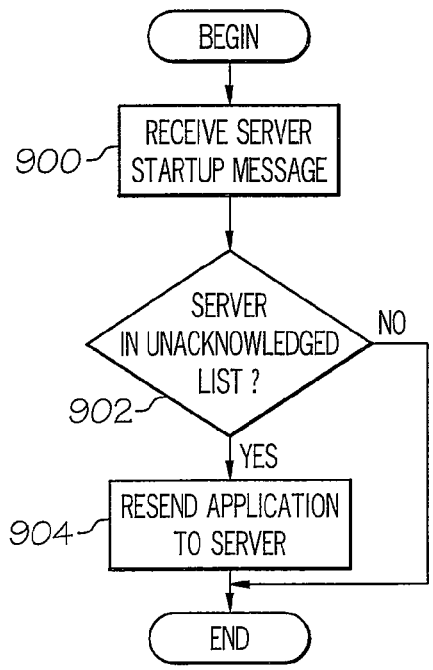
FIG. 9 is a flowchart of a process for resending messages in accordance with a preferred embodiment of the present invention.

FIGS. 8 and 9 illustrate messaging used to ensure applications 506 and 516 in server data processing systems 508 and 514 remain synchronized. The processes depicted in these figures employ a durable subscription system in messaging process 520 to maintain applications 506 and 516 in a synchronized state for a group of servers, such as those in a cluster 104. FIG. 8 is a flowchart of a process for announcing and disseminating application updates 546 in accordance with a preferred embodiment of the present invention. The process in FIG. 8 may be implemented in a deployment system, such as deployment manager 500 in FIG. 5. More specifically, the process may be implemented in messaging process 520 in FIG. 5.

The process begins with deployment manager 500 identifying an application update 546 in repository 502 (step 800). Messaging process 520 then sends messages, announcing the application update 546, to the subscribers (step 802), such as operating systems 504 and 512. In step 802, messaging process 520 sends multiple messages to the subscribers, such as operating systems 504 and 512 regarding the application update 546. In step 802, the recipients, such as operating systems 504 and 512, for the application update 546 are selected using a subscription list, such as subscription list 522 in FIG. 5. Deployment manager 500 then waits to receive acknowledgements of receipt to the application update 546 (step 804) from operating systems 504 and 512. In step 804, the amount of time the process waits depends on the implementation.

Next, a determination is made by deployment manager 500 as to whether all acknowledgements have been received (step 806). If less than all acknowledgments have been received, deployment manager 500 places any of operating systems 504 and 512 from which acknowledgements have not been received in a list (step 808) stored in message history 524, with the process terminating thereafter. The process also terminates in step 806 when all of the acknowledgements have been received.

FIG. 9 is a flowchart of a process for resending messages in accordance with a preferred embodiment of the present invention. The process in FIG. 9 may be implemented in a deployment system, such as deployment manager 500 in FIG.

5. More specifically, the process may be implemented in messaging process 520 in FIG. 5.

The process begins with deployment manager 500 receiving a server startup message (step 900). This message is used to indicate that a server, such as server data processing systems 508 or 514, which may previously have been unavailable, is now available to receive messages.

In another example, deployment manager 500 may ping a server, such as server data processing system 508 or 514, at different intervals to determine if either server data processing system 508 or 514 is now available. Next, a determination is made as to whether the server data processing system 508 or 514 is on an unacknowledged list in message history 524 (step 902). In these examples, the lack of acknowledgements is stored in a data structure, such as message history 524 in FIG. 5. If the server, such as server data processing system 508 or 514, is present on the unacknowledged list in message history 524, deployment manager 500 resends pending application updates 546 to that server (step 904), with the process terminating thereafter. The process also terminates in step 902 is the server is not present in the unacknowledged list in message history 524.

Thus the present invention provides an improved method, apparatus, and computer instructions for managing applications in a set of servers. The mechanism of the present invention involves identifying servers that do not acknowledge an announcement for an application update distribution. When a server is later available, that announcement is resent to the server with the server then updating its applications. In this manner, the mechanism of the present invention allows for automatic resynchronization of a server's applications when the server starts up or becomes available.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. In these examples, applications are maintained for servers in a cluster. The mechanism of the present invention may also be applied to any grouping of servers or other data processing systems, logical or physical. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for updating a distributed application in a multiple application-server environment, in which at least one server receives updates later than another server, said method comprising:

responsive to starting an application server in the data processing system, the application server contacting a deployment manager over a secure connection to determine whether an application update distribution occurred while the application server was unavailable to update an application to be distributed to a plurality of client data processing systems;

responsive to said contacting, the deployment manager attempting to deliver an application update to the application server;

responsive to a failure of delivery of the application update, the deployment manager saving the application update to form a saved message;

responsive to subsequently detecting a presence of the application server, the deployment manager sending the saved message to the first application server;

responsive to receiving the saved message, the first application server updating the one or more applications in the first application server; and the first application server sending the one or more applications that are updated to the plurality of client data processing systems.

2. The method of claim 1, wherein said step of contacting a messaging system further comprises contacting said messaging system with a durable subscription.

3. The method of claim 1, wherein:

the data processing system is a first data processing system; and a remote data processing system different from the first data processing system includes the deployment manager.

4. The method of claim 1, wherein:

the step of contacting a deployment manager includes sending an indication that an application server is present to the deployment manager;

the method further includes the deployment manager returning a message indicating that said application update distribution has occurred while the application server was unavailable.

5. The method of claim 1, wherein the deployment manager saving the application update to form the saved message includes the deployment manager saving the application update to form the saved message in non-volatile storage.

6. The method of claim 1, wherein the deployment manager saving the application update to form the saved message includes the deployment manager saving the application update to form the saved message in a data structure.

7. A system, comprising:

a plurality of server data processing systems, wherein each of the plurality of server data processing systems is operable to be coupled to a network, includes a respective application server, and is operable to distribute an application to a respective plurality of client computing devices through the network; and a deployment manager data processing system operable to be coupled to the network, operable to communicate with each of the plurality of server data processing systems through the network, and including a processor and a memory coupled to the processor, wherein the memory includes instructions executable by the processor to:

transmit via the network a message addressed to at least one of the plurality of server data processing systems;

determine whether or not the message was acknowledged by the at least one of the plurality of server data processing systems;
if the message was acknowledged by the at least one of the plurality of server data processing systems, transmit an application update to the application server of the at least one of the plurality of server data processing systems, wherein the application update is operable to be distributed to the respective plurality of client computing devices of the at least one of the plurality of server data processing systems; and
if the message was not acknowledged by the at least one of the plurality of server data processing systems:
store data associated with the application update and a corresponding identification associated with the application server of the at least one of the plurality of server data processing systems;
receive a message from the application server of the at least one of the plurality of server data processing systems, wherein the message indicates availability of the application server of the at least one of the plurality of server data processing systems to receive application updates; and
responsive to receipt of the message, determine the application update from the data associated with the application update and the corresponding identification and transmit the application update to the application server of the at least one least of the plurality of server data processing systems.

8. The system of claim 7, further comprising:
a non-volatile storage device coupled to the deployment manager data processing system;
wherein the memory further includes instructions executable by the processor to:
store, in the non-volatile storage device, the data associated with the application update and a corresponding identification associated with the application server of the at least one of the plurality of server data processing systems.

9. The system of claim 7, wherein the memory further includes instructions executable by the processor to:
store, in a data structure, the data associated with the application update and the corresponding identification associated with the at least one of the plurality of server data processing systems.

10. The system of claim 7, wherein:
the deployment manager data processing system is operable to communicate through the network in a secure fashion; and
wherein one or more server data processing systems of the plurality of server data processing systems are operable to communicate with the deployment manager data processing system through the network in the secure fashion.

11. A method of data processing, the method comprising:
transmitting a message to a network, wherein the message is addressed to a plurality of server data processing systems, wherein each of the plurality of server data processing systems is coupled to the network and includes a respective application server operable to distribute one or more application updates to a respective plurality of client data processing systems;
determining whether or not the message was acknowledged by at least one of the plurality of server data processing systems;
if the message was acknowledged by the at least one of the plurality of server data processing systems, transmitting, through the network, an application update to the application server of the at least one of the plurality of server data processing systems, wherein the application update is operable to be distributed to the respective plurality of client computing devices of the at least one of the plurality of server data processing systems; and
if the message was not acknowledged by the at least one of the plurality of server data processing systems:
storing data associated with the application update and a corresponding identification associated with the application server of the at least one of the plurality of server data processing systems;
receiving a message from the application server of the at least one of the plurality of server data processing systems, wherein the message from the application server of the at least one of the plurality of server data processing systems indicates that the application server of the at least one of the plurality of server data processing systems is available to receive one or more application updates;
responsive to said receiving the message from the application server of the at least one of the plurality of server data processing systems, determining the application update from the data associated with the application update and the corresponding identification associated with the application server of the at least one of the plurality of server data processing systems; and
transmitting, through the network, the application update to the application server of the at least one least of the plurality of server data processing systems.

12. The method of claim 11, wherein said storing the data associated with the application update and the corresponding identification associated with the at least one of the plurality of server data processing systems includes storing, in a data structure, the data associated with the application update and the corresponding identification associated with the at least one of the plurality of server data processing systems.

13. The method of claim 11, wherein said storing the data associated with the application update and the corresponding identification associated with the at least one of the plurality of server data processing systems includes storing, in non-volatile storage, the data associated with the application update and the corresponding identification associated with the at least one of the plurality of server data processing systems.

14. The method of claim 11, wherein one or more server data processing systems of the plurality of server data processing systems are operable to communicate through the network in a secure fashion.

15. A computer readable storage medium including program code that when executed by a data processing system causes the data processing system to:
transmit a message to a network, wherein the message is addressed to a plurality of server data processing systems, wherein each of the plurality of server data processing systems is coupled to the network and includes a respective application server operable to distribute one or more application updates to a respective plurality of client data processing systems;
determine whether or not the message was acknowledged by at least one of the plurality of server data processing systems;
if the message was acknowledged by the at least one of the plurality of server data processing systems, transmit, through the network, an application update to the application server of the at least one of the plurality of server data processing systems, wherein the application update is operable to be distributed to the respective plurality of client computing devices of the at least one of the plurality of server data processing systems; and if the message was not acknowledged by the at least one of the plurality of server data processing systems:

store data associated with the application update and a corresponding identification associated with the application server of the at least one of the plurality of server data processing systems;

receive a message from the application server of the at least one of the plurality of server data processing systems, wherein the message from the application server of the at least one of the plurality of server data processing systems indicates that the application server of the at least one of the plurality of server data processing systems is available to receive one or more application updates;

responsive to said receiving the message from the application server of the at least one of the plurality of server data processing systems, determine the application update from the data associated with the application update and the corresponding identification associated with the application server of the at least one of the plurality of server data processing systems; and transmit, through the network, the application update to the application server of the at least one least of the plurality of server data processing systems.

* * * * *